June 6, 1939. W. H. HOFFMANN 2,161,351
WHEEL STRUCTURE
Filed Oct. 19, 1937
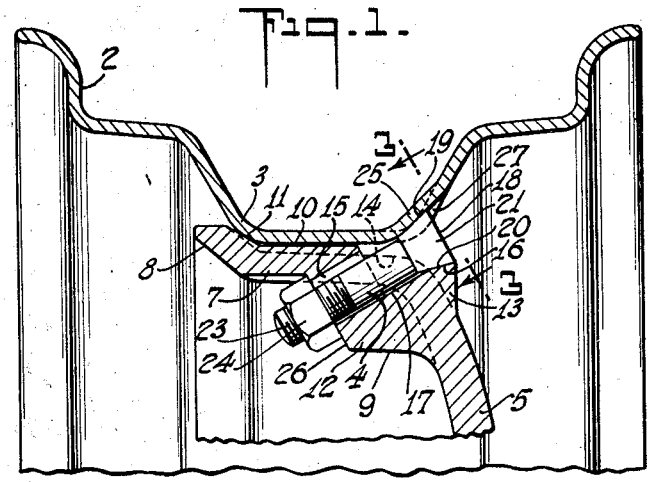
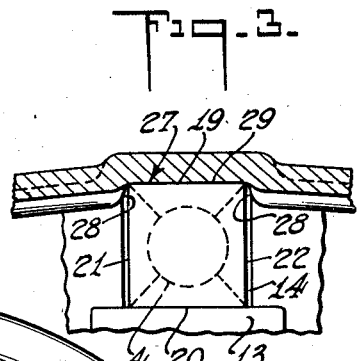
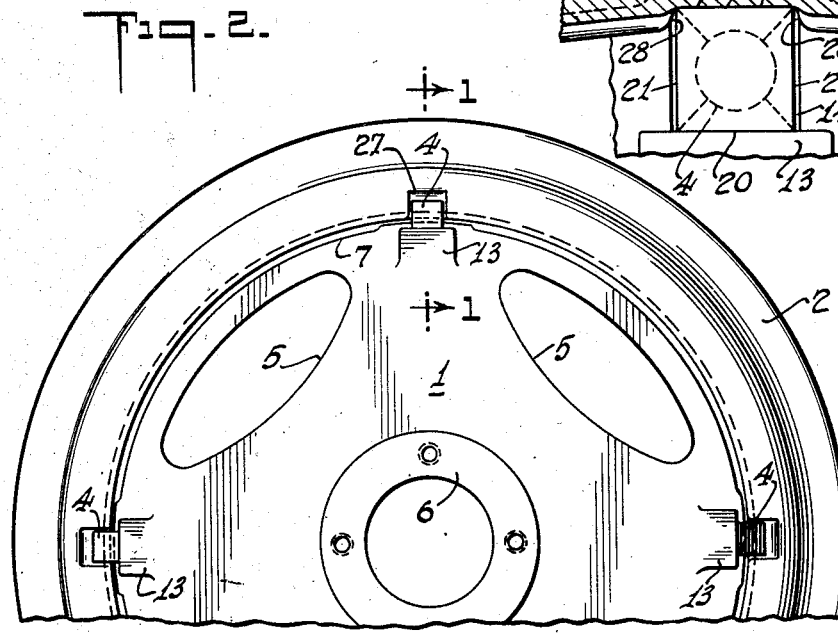
INVENTOR
William H. Hoffmann
BY
Morrison, Kennedy & Campbell
ATTORNEYS.

Patented June 6, 1939

2,161,351

UNITED STATES PATENT OFFICE 2,161,351

WHEEL STRUCTURE

William H. Hoffmann, Davenport, Iowa, assignor to French & Hecht, Incorporated, a corporation of Iowa Application October 19, 1937, Serial No. 169,759

3 Claims. (Cl. 301—20)

This invention relates to wheel structures, and more particularly to wheel structures of the demountable tire rim variety, wherein the rim is removably secured to the wheel body.

In a copending application for United States Letters Patent Ser. No. 169,755, there is disclosed a demountable tire rim wheel structure wherein the rim is supported at one of its side edges by the wheel body and at its opposite side edge by a circumferential series of bolts formed with rim engaging surfaces adapted to effect the centering of the rim with respect to the axis of the wheel when the bolts are anchored in the wheel body to secure the rim thereto. For the purpose of holding the rim against circumferential movement relatively to the wheel body when a driving force is exerted thereon, a plurality of driving bolts are arranged to extend radially through the wheel felly at spaced intervals circumferentially thereof with their head portions engaging in recesses formed in the radially inner surface of the rim.

It is an object of the present invention to provide an improved wheel structure of this character wherein common means is employed to serve the three-fold purpose of centering the rim with respect to the axis of the wheel, holding the rim against circumferential movement relatively to the wheel body, and securing the rim to the wheel body.

To this end, the invention contemplates the provision of a wheel structure of the character set forth, wherein the parts are constructed and arranged so that the wheel securing and rim centering means has an interfitting engagement with the rim to hold it against circumferential movement relatively to the wheel body. More specifically, the wheel structure comprises a wheel body formed to support a demountable tire rim at one of its side edges and a circumferential series of bolts anchored in the wheel body and arranged to support the rim at its opposite side edge, said opposite side edge of the rim being formed with a series of recesses in which the bolt heads are adapted to engage and the bolt heads being formed with opposed oppositely bevelled surfaces adapted to engage the inner walls of the recesses in the rim and the radially outer surfaces of a series of lugs formed on the wheel body. When the bolts are tightened to anchor them to the wheel body, their heads are adapted to wedge between the lugs and the inner walls of the recesses of the rim, thus effecting the centering of the rim with respect to the axis of the wheel and securing the rim to the wheel body; and the recesses in the side edge of the rim are formed so that the heads of the bolts fit closely between the side walls thereof to hold the rim against circumferential movement relatively to the wheel body.

In the accompanying drawing, the invention has been shown merely by way of example and in preferred form, but obviously many variations and modifications may be made therein which will still be comprised within its spirit. It is to be understood, therefore, that the invention is not limited to any specific form or embodiment except insofar as such limitations are specified in the appended claims.

Referring to the drawing:

Fig. 1 is a radial cross section of the improved wheel structure taken on the line 1—1 of Fig. 2, looking in the direction of the arrows;

Fig. 2 is a side elevation of a portion of the improved wheel structure; and

Fig. 3 is a fragmentary view taken on the line 3—3 of Fig. 1, looking in the direction of the arrows.

According to a preferred embodiment of the invention, and as shown in the drawing, the wheel structure comprises a wheel body 1 on which a tire rim 2 is removably mounted, the rim being supported at one of its side edges 3 by the wheel body and at its opposite side edge by a plurality of bolts 4 anchored in the wheel body at spaced intervals circumferentially thereof.

The wheel body 1 is of the disc type comprising a disc 5 equipped with a hub 6 and having a felly 7 formed as an integral continuation of the disc extending to one side thereof and terminating in a radially extending circumferential flange 8. At spaced intervals circumferentially of the wheel body 1, the felly 7 and contiguous portion of the disc 5 are thickened, as at 9, and formed in these localized thickened areas for the support of the rim 2.

Each thickened area 9 of the wheel body 1 is formed to provide bearing surfaces 10 and 11 extending radially slightly beyond the peripheral surface of the felly 7 and flange 8, respectively, a boss 12 on the axially inner side of the disc 5, and a lug 13 on the axially outer side of the disc 5. The bearing surface 10 extends substantially horizontally across the felly 7, while the bearing surface 11 is disposed at an angle to the axis of the wheel and intersects the bearing surface 10 at the junction of the felly 7 and flange 8. In order to accommodate the bolt 4, the thickened portion 9 is formed throughout a part of its axial extent and intermediate its side edges to provide a recess 14 (Figs. 1 and 3) and throughout the remainder of its extent it is formed with an opening 15, the radially inner walls of the recess 14 and opening 15 forming a continuous surface 17 disposed at an angle to the axis of the wheel, preferably an angle of 60°.

The bolt 4 is formed with a head 18 which is square in cross section and presents opposed oppositely bevelled surfaces 19, 20 and 21, 22 and the opposite end of the bolt is formed with threads 23 to receive a nut 24. The bolt 4 is adapted for anchorage in the wheel body 1 with the head 18 located between the axially outer side edge 25 of the rim 2 and the surface 16 of the lug 13 and with the nut 24, threaded on the opposite end of the bolt, engaging surface 26 of the boss 12.

A circumferential series of recesses 27 having side walls 28 and inner walls 29 are formed in the side edge 25 of the rim 2, the number and spacing of the recesses corresponding to the number and spacing of the bolts 4. The bolt heads 18 are adapted to engage in the recesses 27 and fit closely between the side walls 28 thereof, whereby the bolt 4, being confined between the side walls of the recess 14 and thus held against circumferential movement relatively to the wheel body, serve to hold the rim against such relative movement when a driving force is exerted on the wheel.

The inner walls 29 of the recess are preferably inclined for two purposes, namely, to provide a large bearing surface for the surface 19 of the bolt heads to engage and to render the formation of the recesses as deep as possible with but a slight alteration of the shape of the side edge 25 of the rim. It will also be noted that the surfaces 16 of the lugs 13 are formed at an angle to the surfaces 17 to provide large bearing surfaces for the bolt heads 18; and that the openings 15 are radially elongated to permit the bolts 4 to shift radially bodily as the surface 20 of the bolt head 18 moves relatively to the surface 16 of the lug 13 when the bolt is tightened.

In mounting the rim 2 on the wheel body 1, the rim is located to rest loosely on one or more of the bearing surfaces 10, depending upon the disposition of the wheel body at the time, with the recesses 27 in the rim in substantial alignment with the recesses 14 in the wheel body, the bolts 4 then inserted in place and the nuts 24 threaded on the ends of the bolts to draw the surfaces 19 and 20 of the head portions 18 into engagement with inner walls 29 of the recesses 27 in the rim 2 and the surfaces 16 of the lugs 13, respectively. Further tightening of the nuts 24 on the bolts 4 draws the latter lengthwise (toward the left in Fig. 1) and the wedging of the oppositely bevelled surfaces 19 and 20 of the bolt heads 18 between the rim 2 and lugs 13 effects a lateral and radial thrust on the rim 2, causing its edges 3 and 25 to ride up the bearing surfaces 11 and the surfaces 19 of the bolt heads 18, respectively, thus centering the rim 2 with respect to the axis of the wheel and at the same time securing it to the wheel body 1. The bevelled surface 20 of the bolt head 18 engaging the surface 16 of the lug 13 causes the bolt 4 to shift bodily radially, and this movement is permitted by the radially elongated opening 15, as already stated.

With the foregoing arrangement, it will be seen that the bolts 4 provide unitary members for serving the three-fold purpose of centering the rim 2 with respect to the axis of the wheel, holding the rim against circumferential movement relatively to the wheel body, and securing the rim to the wheel body. Moreover, the heads 18 of the bolts 4 which wedge between the rim 2 and lugs 13 are heavy and durable and the only force on the shanks of the bolts is the tensioning force produced by tightening the nuts 24. Furthermore, another feature of prime importance is that the only relative movement between the lugs 13 and rim 2 and the wedging surfaces of the bolt heads is that produced in effecting the wedging action by a lengthwise movement of the bolts, so that any wear will simply allow the bolts to be drawn up further and present new unworn portions of the surfaces in engagement with the rim and lugs; and, when necessary, the bolts can be located to present the other opposed surfaces 24 and 25 to effect the wedging action. Also, the wedging surfaces can be reconditioned, if desirable, by forging the heads of the bolts and regrinding the surfaces thereof.

As already stated, a preferred embodiment of the invention has been shown and described and obviously many variations and modifications of the invention will suggest themselves to those skilled in the art. For example, the invention may be embodied as well in a fellyless wheel as in a wheel having a felly. Actually, the arrangement of the preferred embodiment is a combination of the two, since the wheel body is formed with a continuous felly portion for strength and other purposes, yet the rim supporting surfaces and securing means are localized in the thickened portions 9 of the wheel body, so that the sections of the felly intermediate the thickened portions play no direct part in the support of the rim. It is to be understood, therefore, that the invention is not limited to any specific form or embodiment except insofar as such limitations are specified in the appended claims.

Having thus described my invention what I claim is:

1. In a wheel structure, the combination of a demountable rim, a wheel body, means formed on the wheel body to support the rim centered with respect to the axis of the wheel, a circumferential series of apertures formed in the wheel body, a plurality of rim securing members formed with tapered rim engaging portions and arranged in said apertures at an angle to the axis of the wheel, and fastening means to move the rim securing members axially and radially inward relatively to the wheel body and rim to force the rim axially and radially outward and secure it on its centering support, the rim being formed with means adapted for interfitting engagement with said rim securing members so that the members hold the rim against circumferential movement relatively to the wheel body.

2. A wheel structure according to claim 1, wherein the rim is formed with a circumferential series of recesses into which the tapered portions of the rim securing members are adapted to fit.

3. In a wheel structure, the combination of a demountable rim, a wheel body, means formed on the wheel body to support the rim centered with respect to the axis of the wheel, a circumferential series of bolt holes formed in the wheel body, lugs formed on one side of the wheel body adjacent the bolt holes, surfaces adjacent the bolt holes on the opposite side of the wheel body extending at an angle to the axis of the wheel and against which fastening nuts are adapted to bear, bolts arranged in the bolt holes with their longitudinal axes disposed at an angle to the axis of the wheel, said bolts being formed with heads presenting tapered rim engaging surfaces, recesses formed in the rim in which the tapered heads of said bolts fit, said recesses presenting inner surfaces against which the rim engaging surfaces of tapered bolt heads bear, and fastening nuts screwed on the bolts and bearing against said angularly disposed surfaces to hold the tapered bolt heads wedged between said lugs and the rim to secure the latter to its centering support.

WILLIAM H. HOFFMANN.